Feb. 21, 1956   F. H. MUELLER ET AL   2,735,444
FLUID PRESSURE REGULATOR
Filed April 8, 1953   2 Sheets-Sheet 1

INVENTORS
Frank H. Mueller
Earl E. Tinker
BY Cushman, Darby & Cushman
ATTORNEYS

Feb. 21, 1956 — F. H. MUELLER ET AL — 2,735,444
FLUID PRESSURE REGULATOR
Filed April 8, 1953 — 2 Sheets-Sheet 2

INVENTORS
Frank H. Mueller
Earl E. Tinker

BY Cushman, Darby & Cushman
ATTORNEYS

United States Patent Office 2,735,444
Patented Feb. 21, 1956

2,735,444

FLUID PRESSURE REGULATOR

Frank H. Mueller and Earl E. Tinker, Decatur, Ill., assignors to Mueller Co., Decatur, Ill., a corporation of Illinois Application April 8, 1953, Serial No. 347,568

5 Claims. (Cl. 137—505.44)

This invention relates to fluid pressure regulators adapted to handle substantially all types of free-flowing fluids, such as air, gas, water, oil, etc., and more particularly to an improved pressure regulator which has an increased flow capacity for a given seat diameter and less tendency for the valve disc to chatter on its seat. This application is a continuation-in-part of our copending application, Serial No. 240,818, filed August 8, 1951, now abandoned.

Fluid pressure regulators, i. e., pressure reducing and regulating valves, of the type under consideration usually have a pressure or recovery chamber provided with a movable wall, such as a diaphragm, that is connected to a valve controlling an inlet or flow port to the pressure chamber. The valve is biased, normally by a spring, in a direction tending to open the same, while the connection between the movable wall and the valve is such that an increase in pressure in the pressure chamber tends to close the valve. These two forces are self-balancing to vary the effective valve opening and maintain a constant pressure in the chamber, and of the fluid which flows out of the outlet from the chamber, regardless of the rate of flow of fluid passing through the regulator. The pressure setting of the regulator can be varied by adjusting the spring force.

The maximum volumetric capacity of, or rate of flow of fluid through, a pressure regulator of this type, for a given valve opening and inlet pressure, is usually determined by the cross-sectional area or diameter of the valve port. The efficiency of such regulators is measured by comparing the rate of flow, for a given valve opening, with theoretical full flow through the valve port at the velocity of the pressure differential, assuming the port to be 100% efficient orifice. Conventional regulators usually have an efficiency of about 50% at 50% valve opening, considering the valve to be fully open when raised from its seat a distance equal to about one-fourth of the diameter of the valve port.

The valve in a regulator of the type under consideration usually consists of a bead seat encompassing or bounding the outlet end of the flow port to the recovery chamber and a reciprocating valve disc seatable on the seat. When the valve is open, i. e., the valve disc is raised, from its seat, a thin stream of fluid, termed "seat flow stream," flows at high velocity radially outwardly from between the partially open valve disc and its seat. Because of its high velocity, this seat flow stream has an extremely low static pressure, termed "seat flow pressure," that operates on an annular area of the valve disc to impart a closing effect thereto, i. e., to draw the valve disc back against the seat. Such closing effect tends to unbalance the forces acting on the valve disc, i. e., the pressure force tending to close the valve disc and the spring force tending to open the valve disc, and thereby causes the valve disc to chatter on its seat, a highly undesirable effect.

Accordingly, it is an object of this invention to provide a pressure regulator of the type under consideration with increased flow capacity for a given seat diameter.

It is another object of this invention to provide an improved pressure regulator, of simple design, which has increased efficiency for a given valve opening.

It is a further object of this invention to provide an improved pressure regulator in which the closing effect is minimized with consequent reduction of chattering tendencies.

Other objects and advantages of the invention will be apparent from the following description and accompanying drawings in which.

Figure 5:
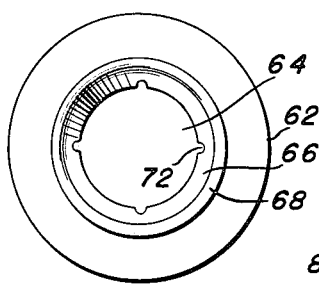
Figure 5 is an end view of the seat ring shown in Figure 4, taken from the top of the latter figure.
Figure 4:
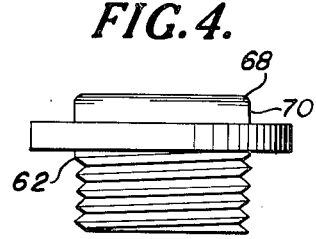
Figure 4 is an enlarged side view of the seat ring shown in Figure 1.
Figure 1:
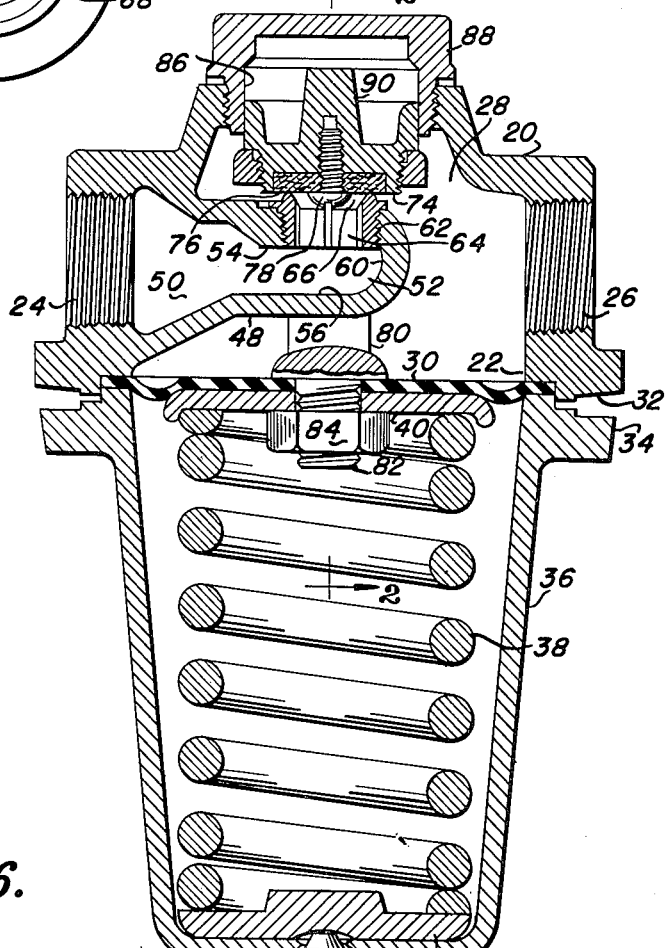
Figure 1 is a vertical sectional view of a fluid pressure regulator embodying this invention.

Referring now to the drawings, there is shown in Figure 1 a fluid pressure regulator having a casing 20 provided with lower large opening 22, a high pressure fluid inlet 24, and a reduced pressure fluid outlet 26 aligned with the inlet, both the inlet 24 and outlet 26 being interiorly threaded for connection of the regulator into a line (not shown). The interior of the casing 20 forms a recovery chamber 28 having a wall thereof formed by a flexible diaphragm 30 closing the opening 22 and having its marginal edges clamped between flanges 32 and 34 on the casing and on a bonnet or cover 36 bolted thereto, respectively. The diaphragm 30 is biased inwardly of the recovery chamber 28 by a coil compression spring 38 disposed in the bonnet 36 and having one end thereof bearing against a rigid diaphragm backing plate 40. The other end of the spring 38 bears against a spring washer or button 42 that is adjustable axially of the spring, to vary the compression thereof, by a screw 44 threaded centrally through the bonnet 36 and provided with a lock nut 46. The air space within the bonnet or cover 36 may be vented to atmosphere by suitable means (not shown).

Figure 2:
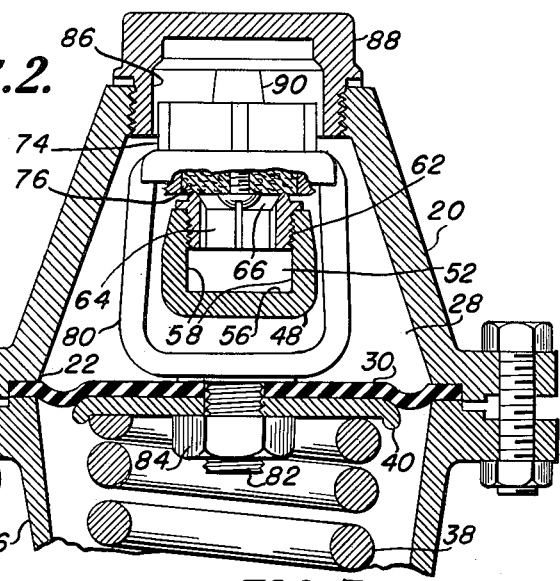
Figure 2 is a fragmentary sectional view taken on line 2—2 of Figure 1.

A nipple 48 integral with the casing 20 extends into the recovery chamber 28 from the inlet 24 and forms a tapered inlet passage 50 that merges into an inlet chamber 52 which is substantially flat as compared to its length and width. This chamber 52 is substantially rectangular in cross-section, as shown best in Figure 2, and has opposed top and bottom walls 54 and 56, respectively, of substantially greater area than the side walls 58 and the end wall 60 of the chamber 52. Threaded centrally through the top wall 54 of the inlet chamber 52, on the opposite side of the nipple 48 from the diaphragm 30, is a nipple or seat ring 62 forming a flow port 64 from the inlet 52 chamber to the recovery chamber 28.

Figure 6:
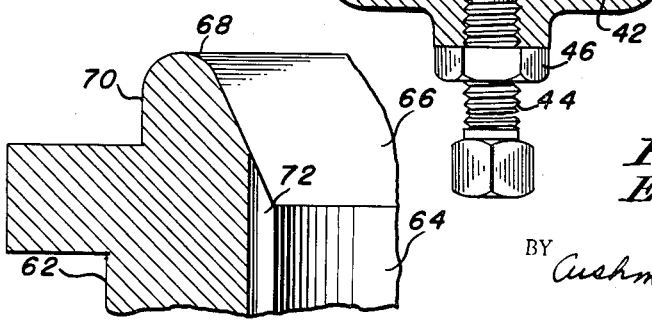
Figure 6 is an enlarged fragmentary sectional view of a seat ring embodying this invention and illustrating details of the valve orifice.
Figure 3:
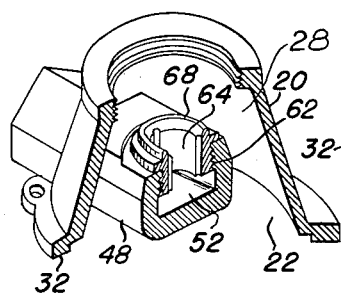
Figure 3 is a fragmentary perspective view, partially in section, of a portion of the regulator shown in Figure 1.

The interior of the seat ring 62, i. e., the flow port 64, is of substantially constant diameter save at its outlet or orifice 66 where it flares outwardly and merges into a rounded end of the seat ring that forms an annular valve bead seat 68, best shown in Figure 6. The exterior of the rounded end of the seat ring 62 merges smoothly with an exterior cylindrical section 70 of constant diameter that extends rearwardly of the outlet end of the seat ring. The flow port 64 is of substantially less cross-sectional area than that of the wall 54 of the inlet chamber 52 and of a diameter about equal to the distance between the walls 54 and 56. By actual test it has been determined that the flare angle of the valve orifice 66 preferably should be of the order of from about 30° to about 45° to the axis of the seat ring 62, and the minor diameter of the flared valve orifice, i. e., the diameter of the flow port 64, should be of the order of from about ½ to about ⅔ of its major diameter in order to provide an effective flare length. The reasons for these limitations and the desirability of a flared valve orifice will be explained more in detail hereinafter. Interior longitudinal grooves 72 may be provided in the seat ring 62 for engagement by a suitable tool (not shown) to screw the seat ring into the nipple 48.

Seating on the bead seat 68 is a reciprocating valve head or disc 74 having a conventional flat valve washer 76 of relatively soft composition material set into the end face thereof and secured to the disc by a central screw 78. The valve disc 74 has a reduced exteriorly-threaded portion engaged within a threaded central opening at one end of a yoke 80. A threaded stem 82 on the other end of the yoke 80 projects centrally through the diaphragm 30 and the diaphragm backing plate 40 and is clamped thereto by a nut 84.

The upper portion of the valve disc 74 is in the shape of a hex-nut (see Figure 2) having rounded corners for slidable movement in a cylindrical guiding recess 86 formed in an access cap or plug 88 threaded into an opening in the casing 20 opposite the diaphragm 30. Recessed into and projecting centrally from the upper end of the valve disc 74 is a square, or otherwise suitably shaped, projection 90 for engagement by a wrench or the like for unscrewing the valve disc from the yoke 80.

From the construction thus far described, it will be seen that the spring 38 biases the valve disc 74 to open position, thereby permitting pressure fluid to flow from the inlet 24, through the inlet chamber 52 and flow port 64, into the recovery chamber 28. As pressure builds up within the recovery chamber 28, the pressure on the diaphragm 30 tends to seat the valve disc 74 because of the yoke connection. Thus, the valve disc 74 becomes stabilized at a position between closed and full open, depending upon the rate of flow through the regulator, to maintain a constant outlet pressure less than that of the inlet pressure. This outflow pressure may be changed by adjustment of the bolt 44 to change the spring force urging the valve to open.

In this improved pressure regulator, after the valve is raised to about 20% of full opening the efficiency of the regulator becomes greater than that of a conventional regulator having a straight bore valve orifice. The regulator exhibits a pronounced advantage in flow from this point (20% of full opening) on, in that there is an increase in volumetric rate of flow through the regulator as compared to conventional regulators for the same diameter bead seat. Such flow increase may be observed by comparison of the showing of Figures 7 and 9.

Figure 9:
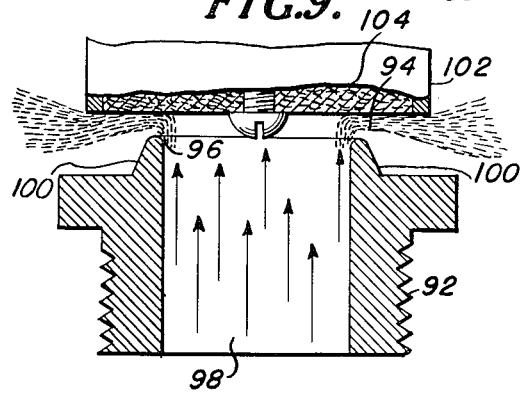
Figure 9 is a view corresponding to Figure 7, but illustrating conventional valve parts.
Figure 7:
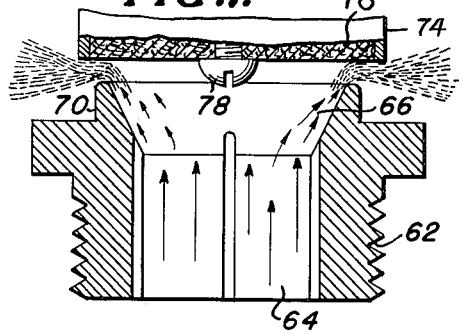
Figure 7 is an enlarged fragmentary sectional view illustrating flow through the partially-open valve of a regulator embodying this invention.

Referring now to Figure 9, it will be seen that a conventional pressure regulator has a seat ring 92 provided with a rounded end forming a bead seat 94 which bounds a straight bore valve orifice 96 which simply is a continuation of the flow port 98 through the seat ring. Further, the seat ring has a uniform exterior taper 100 from a point spaced rearwardly of the bead seat 94 toward the latter. It will be seen that when the valve disc 102, and its washer 104, is raised from the bead seat 94 of the conventional seat ring 92, the circular sheet of fluid emerging from between the valve disc and the bead seat is relatively thin as compared to a like sheet of fluid merging from between the disc 74 and bead seat 68 of an improved valve embodying this invention, as shown in Figure 7. This increase in thickness (which has been observed in actual practice) of the seat flow stream emerging from the improved valve results in a flow increase through the regulator for a given valve opening and inlet pressure. At about 50% opening of the improved valve, this increased volume of delivery is about 25% more than the same opening in a conventional valve. Expressed otherwise, at about 50% of valve opening the improved regulator has an efficiency of about 63% as compared with the efficiency of about 50% in the case of a conventional regulator having a straight bore orifice, such as that shown in Figure 9.

The theory of operation of the flared valve orifice may be explained somewhat by reference to the arrows appearing in Figures 7 and 9. As shown in Figure 9, the original components of flow are moving generally axially of the straight bore valve orifice 96 and tend to compress or flatten the stream as it turns abruptly to emerge from between the valve disc 102 and its seat 94. In the improved orifice 66 having the specified dimensional characteristics, however, as shown in Figure 7, the original axial flow components tend to turn gradually outwardly along the flared walls of the orifice 66 as they approach the bead seat 68, and their action in flattening the final circular seat flow stream is minimized. Consequently, the seat flow stream of the improved valve is substantially thicker than that of a conventional valve for a given valve opening, with a resulting increase in flow rate through the valve, i. e., volume delivered per unit of time.

It is also believed that the flat wide inlet chamber 52 is a factor in the improved efficiency of the regulator since fluid is presented to the flow port 64 in a condition of minimum turbulence. Since the port 64 is located centrally in a wall of much larger area, flow into the port is taken from the center of the inlet chamber 52 where any whirling or swirling effect is at a minimum. It is known that when fluid flows around a corner in an abrupt pipe bend, that fluid tends to leave the wall at the inner side of the bend and impact heavily against the outer wall of the bend with consequent greatly increased turbulence and resistance to flow. By the aforedescribed construction of the relatively flat inlet chamber 52 having the flow port 64 opening centrally thereto, the "going around a corner" effect is minimized thereby reducing resistance to flow with a consequent increase in flow capacity.

Figure 10:
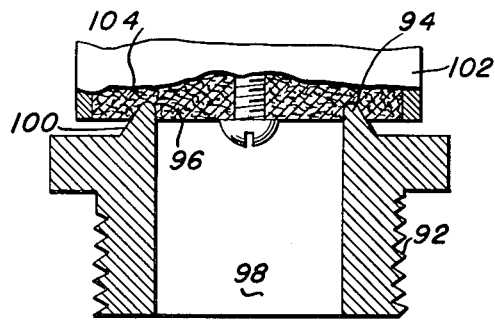
Figure 10 is a view corresponding to Figure 9, but illustrating the position of the valve parts when closed.
Figure 8:
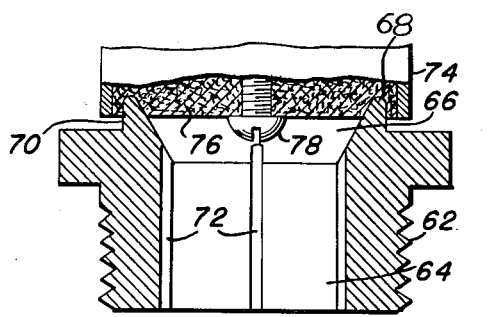
Figure 8 is a view corresponding to Figure 7, but illustrating the position of the valve parts when closed.

The reduced static pressure of a seat flow stream is effective on the annular area of a valve disc outwardly beyond its bead seat to exert a closing effect on the disc. This closing effect can be minimized only by making the annular area of a valve disc affected by the seat flow pressure as small as possible for a given diameter valve seat, i. e., by making the disc diameter as small as possible. In a conventional seat ring construction as, shown in Figures 9 and 10, the valve washer 104, together with its valve disc 102, must have sufficient material disposed radially outwardly of the line of initial contact between the washer and its seat 94 to accommodate the aforedescribed exterior taper 100 of the end of the seat ring 92, since the washer becomes somewhat embedded on the bead seat when the valve is closed, as shown in Figure 10. By means of a flared valve orifice without an exterior seat ring taper, as described above, the necessity for this extended area of material is minimized with a constant reduction possible in overall washer and valve disc diameter for any given size bead seat to thus minimize the closing effect of the seat flow pressure.

In connection with a flared valve orifice, it has been generally presumed heretofore that regulator capacity is governed by the minor diameter of the valve flow port. This presumption is incorrect, however, and it has been found that a relatively small minor diameter may be used with a flared valve orifice and result in an actual increase in capacity for a given seat diameter.

It will thus be seen that the objects of this invention have been fully and effectively accomplished. It will be realized, however, that various changes may be made in the specific embodiment shown and described to illustrate the principles of this invention without departing from such principles. Therefore, this invention includes all modifications encompassed by the spirit and scope of the following claims.

We claim:

1. In a fluid pressure regulator having a recovery chamber provided with an inlet and an outlet, a reciprocating valve disc in the chamber controlling the inlet, means for yieldingly urging the disc to open position, and means responsive to the pressure within the chamber for urging the disc to closed position, the combination of means defining a valve orifice having an annular valve seat for the disc at the outlet end thereof, the walls of said orifice being flared in the direction of fluid flow, the flare angle of said orifice being of the order of from about 30° to about 45° to the axis of said valve seat and the minor diameter of said orifice being of the order of from about ½ to ⅔ of the major diameter thereof, whereby the efficiency of the regulator is increased.

2. The structure defined in claim 1 wherein the orifice and seat are formed by a seat ring having a rounded end edge to provide a bead seat and having a section of uniform exterior diameter merging with and extending rearwardly from said bead seat.

3. In a fluid pressure regulator having a recovery chamber provided with an inlet and an outlet, a reciprocating valve disc in the chamber controlling the inlet, means for yieldingly urging the disc to open position, and means responsive to the pressure within the chamber for urging the disc to closed position, the combination of means defining an inlet chamber having a substantially planar wall; means defining a valve flow port extending centrally through said wall and opening into the recovery chamber, the inlet end of said port being of substantially less cross-sectional area than the area of said one wall and the outlet end of said port having a flaring valve orifice; and an annular valve seat for the disc circumscribing said orifice, the flare angle of said orifice being of the order of from about 30° to about 45° to the axis of said valve seat and the minor diameter of said orifice being of the order of from about ½ to ⅔ of the major diameter thereof.

4. In a fluid pressure regulator having a casing forming a recovery chamber provided with an inlet and an outlet, a flexible diaphragm forming a wall of the chamber, an annular valve seat in the chamber, a valve disc seatable thereon, and a connection between the diaphragm and the valve disc, the combination of a nipple projecting from the inlet into the casing and having an inlet chamber therewithin substantially in the shape of a rectangular prism, said inlet chamber having a pair of opposed parallel substantially planar walls spaced apart a distance substantially less than their length and width; and means defining a valve flow port extending centrally through one of said walls and having an inlet end of substantially less cross-sectional area than the area of said one wall, said port terminating at its outlet end in a flared valve orifice circumscribed by the valve seat, the flare angle of said orifice being of the order of from about 30° to about 45° to the axis of the valve seat and the minor diameter of said orifice being of the order of from about ½ to ⅔ of the major diameter thereof.

5. In a fluid pressure regulator having a recovery chamber provided with an inlet and an outlet, a reciprocating valve disc in the chamber controlling the inlet, means yieldingly urging the disc to open position, and means responsive to the pressure within the chamber for urging the disc to closed position, the combination of means for increasing the efficiency of the regulator, said means including a flared valve orifice circumscribed by an annular bead seat with which the valve disc cooperates, the flare angle of said orifice being of the order of from about 30° to about 45° to the axis of the valve seat and the minor diameter of the orifice being of the order of from about ½ to about ⅔ of the major diameter thereof.

References Cited in the file of this patent

UNITED STATES PATENTS

| 611,892 | Champ | Oct. 4, 1898 |
| 918,288 | Crowe | Apr. 13, 1909 |
| 2,051,350 | Smith | Aug. 18, 1936 |
| 2,219,324 | Lee | Oct. 29, 1940 |

FOREIGN PATENTS

| 494,109 | France | Aug. 30, 1919 |